United States Patent
Stilwell et al.

(10) Patent No.: US 11,329,735 B2
(45) Date of Patent: *May 10, 2022

(54) CALIBRATION DEVICE, METHOD AND PROGRAM FOR ACHIEVING SYNCHRONIZATION BETWEEN AUDIO AND VIDEO DATA WHEN USING SHORT RANGE WIRELESS AUDIO DEVICES

(71) Applicant: ARRIS Enterprises LLC, Suwanee, GA (US)

(72) Inventors: Scott Stilwell, Suwanee, GA (US); Charles Hardt, Lawrenceville, GA (US); Dmitry Barablin, Lawrenceville, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,669

(22) Filed: Dec. 1, 2020

(65) Prior Publication Data

US 2021/0083783 A1 Mar. 18, 2021

Related U.S. Application Data

(63) Continuation of application No. 15/375,044, filed on Dec. 9, 2016, now Pat. No. 10,892,833.

(51) Int. Cl.
*H04M 1/725* (2021.01)
*H04B 17/21* (2015.01)
(Continued)

(52) U.S. Cl.
CPC ......... *H04B 17/21* (2015.01); *H04L 65/4084* (2013.01); *H04L 65/60* (2013.01);
(Continued)

(58) Field of Classification Search
CPC ........................... H04B 17/21; H04L 65/4084
See application file for complete search history.

(56) References Cited

U.S. PATENT DOCUMENTS 6,088,333 A * 7/2000 Yang ................. H04Q 11/0478
370/231
8,505,054 B1 8/2013 Kirley
(Continued)

FOREIGN PATENT DOCUMENTS

WO 2016/008131 1/2016

OTHER PUBLICATIONS

PCT Search Report & Written Opinion, RE: Application No. PCT/US2017/062786, dated Jan. 26, 2018.
(Continued)

*Primary Examiner* — Tuan H Nguyen
(74) *Attorney, Agent, or Firm* — Wenderoth, Lind & Ponack, L.L.P.

(57) ABSTRACT

An electronic apparatus, method, and algorithm achieve synchronization between video data executed on a video sink device and audio data executed on one or more Bluetooth audio sink devices. The electronic apparatus, method, and algorithm obtain calibration information for the one or more Bluetooth devices, determine a delay for outputting the video and audio data to the video sink device using the calibration information, control the Bluetooth transceiver to output the audio data to the one or more Bluetooth devices, and control the output circuit to output the video and audio data to the video sink device in accordance with the determined delay.

38 Claims, 10 Drawing Sheets

(51) Int. Cl.
*H04L 65/60* (2022.01)
*H04L 65/612* (2022.01)
*H04W 4/80* (2018.01)
*H04N 21/4363* (2011.01)
*H04N 21/485* (2011.01)
*H04S 7/00* (2006.01)
*H04R 5/02* (2006.01)
*H04N 17/00* (2006.01)
*H04M 1/72412* (2021.01)
*H04N 21/43* (2011.01)

(52) U.S. Cl.
CPC ...... *H04M 1/72412* (2021.01); *H04N 17/004* (2013.01); *H04N 21/43076* (2020.08); *H04N 21/43637* (2013.01); *H04N 21/4852* (2013.01); *H04R 5/02* (2013.01); *H04S 7/301* (2013.01); *H04W 4/80* (2018.02)

(56) References Cited

U.S. PATENT DOCUMENTS

| | | |
|---|---|---|
| 2006/0002681 A1 | 1/2006 | Spilo |
| 2007/0220561 A1 | 9/2007 | Girardeau, Jr. et al. |
| 2008/0022309 A1 | 1/2008 | Begeja |
| 2008/0092204 A1 | 4/2008 | Bryce |
| 2009/0003379 A1 | 1/2009 | Shao |
| 2009/0059962 A1 | 3/2009 | Schmidt |
| 2009/0172191 A1* | 7/2009 | Dumitriu ................ H04L 47/70 709/241 |
| 2009/0282452 A1 | 11/2009 | Wei |
| 2012/0063603 A1 | 3/2012 | Evans |
| 2012/0265807 A1 | 10/2012 | Kowalewski |
| 2013/0014196 A1 | 1/2013 | Stokking |
| 2013/0135526 A1 | 5/2013 | Minemura |
| 2014/0270680 A1 | 9/2014 | Bloch |
| 2014/0348327 A1 | 11/2014 | Linde et al. |
| 2014/0376873 A1 | 12/2014 | Tanaka |
| 2015/0067726 A1 | 3/2015 | Glasser |
| 2015/0149184 A1 | 5/2015 | Kim |
| 2015/0195425 A1 | 7/2015 | McRae |
| 2015/0208161 A1 | 7/2015 | Lesaffre |
| 2015/0296247 A1 | 10/2015 | Glasser |
| 2016/0028925 A1 | 1/2016 | Fischer |
| 2016/0173931 A1 | 6/2016 | Eber et al. |
| 2016/0196851 A1 | 7/2016 | Cohen |
| 2016/0286260 A1 | 9/2016 | Lawrence |
| 2016/0323612 A1 | 11/2016 | Stewart |
| 2016/0345051 A1 | 11/2016 | Stewart |
| 2017/0230454 A1 | 8/2017 | Ferrer |

OTHER PUBLICATIONS

Office Action dated Oct. 5, 2020, in Canadian Patent Application No. 3,046,645.
Communication pursuant to Article 94(3) EPC dated Mar. 17, 2021, in European Patent Application No. 17811789.1.

* cited by examiner

CALIBRATION DEVICE, METHOD AND PROGRAM FOR ACHIEVING SYNCHRONIZATION BETWEEN AUDIO AND VIDEO DATA WHEN USING SHORT RANGE WIRELESS AUDIO DEVICES

BACKGROUND

Consumer electronic devices are being used more and more in homes and in combination with other electronic devices such as set-top boxes. A set-top box houses electronic circuits that convert signals received from a service provider into signals usable by consumer devices for displaying audio/video media content such as television programming and movies. The service providers include, for example, cable television providers, satellite television providers, internet service providers, and multiple system operators.

The types of consumer electronic devices being served by set-top boxes are also varied and include devices such as televisions, computers, portable devices, electronic tablets, smart phones, and Bluetooth devices. Whether it is Bluetooth sound bars, Bluetooth headphones or other Bluetooth audio sink devices, a synchronization problem often arises with regard to the audio data being output by the Bluetooth devices and the video data being output by the video sink devices.

That is, there may be a time difference between the video and audio output from the video sink devices, and audio output from the Bluetooth devices. Many times, this type of mismatch is enough to cause noticeable and annoying lip-sync problems. The lip-sync problem is due to the fact that there are primary and secondary delays associated with the use of the Bluetooth devices. The primary delays are related to transmitting the audio data using a Bluetooth protocol and the secondary delays are related to the Bluetooth devices processing the audio data. Additional lip-sync problems can be created when using multiple Bluetooth devices because different Bluetooth devices may have different primary and secondary delays.

Using conventional techniques, there is no effective way to consistently determine and configure what delays (e.g., video and audio delays) should be used so that the video presentation matches the audio presentation for all the Bluetooth devices. Thus, there is a need to be able to consistently determine and configure what delays (e.g., video and audio delays) should be used so that the video presentation matches the audio presentation for all Bluetooth devices.

SUMMARY

In an embodiment described in the present application, an electronic apparatus is implemented to achieve synchronization between video data displayed on a video sink device and audio data executed on one or more Bluetooth devices.

The electronic apparatus includes an input circuit, an A/V decoder, an output circuit, a Bluetooth transceiver, and a controller. The input circuit receives audio and video (A/V) content from an A/V content provider, the A/V decoder decodes the A/V content to obtain video data and audio data, the output circuit outputs the A/V data to the video sink device, and the Bluetooth transceiver wirelessly communicates information with one or more Bluetooth devices according to a wireless protocol, wherein the information includes the audio data. The wireless protocol may be a Bluetooth wireless protocol, and the electronic apparatus may be a set-top box.

Additionally, the controller obtains first or second calibration information for the one or more Bluetooth devices, determines a first delay for outputting the A/V data to the video sink device using the first or second calibration information, controls the Bluetooth transceiver to output the audio data to the one or more Bluetooth devices, and controls the output circuit to output the A/V data to the video sink device in accordance with the first delay.

In an embodiment described in the present application, the electronic apparatus includes an Infrared (IR) receiver for receiving an IR signal from a remote electronic device for performing control operations on the electronic apparatus and the video sink device. Additionally, the electronic apparatus includes a user interface for providing input instructions that can also be used for performing control operations on the electronic apparatus and the video sink device. In this case, the controller controls the output circuit to output a calibration animation to be displayed on the video sink device and controls the Bluetooth transceiver to output a calibration audio signal to be executed on the one or more Bluetooth devices. The IR signal from the remote electronic device or the input instructions from the user interface includes a command signal for synchronizing the calibration animation displayed on the video sink device with the calibration audio signal executed on the one or more Bluetooth devices, and the command signal is used by the controller as the first calibration information for determining the first delay for outputting the A/V data to the video sink device.

The output of the calibration animation displayed on the video sink device, the output of the calibration audio signal to the one or more Bluetooth devices, and use of the command signal for synchronizing the calibration animation with the calibration audio signal may be performed in a calibration mode.

In an embodiment described in the present application, the controller controls the Bluetooth transceiver to output a time marker message and an audio clip to the one or more Bluetooth devices, and receives responses from the one or more Bluetooth devices based on receipt of the time marker message and an audio clip. The responses include a first response with information on a round-trip transmission time between the electronic apparatus and the one or more Bluetooth devices and a second response with information on an audio processing time by the one or more Bluetooth devices of the audio clip.

In this embodiment, the first and second responses from the one or more Bluetooth devices are used by the controller as the second calibration information for determining the first delay for outputting the A/V data to the video sink device. The controller calculates the delay for outputting the A/V data to the video sink device using the formula: Delay=½(Round Trip Bluetooth Transmission Time)+(Audio Processing Time).

In an embodiment described in the present application, the first and second responses from the one or more Bluetooth devices are used by the controller to: calculate a lag delay for each of the one or more Bluetooth devices, compare the lag delays of all the one or more Bluetooth devices, and determine a second delay for outputting the audio data to each of the one or more Bluetooth devices. The controller determines each of the lag delays for the one or more Bluetooth devices using the formula: Lag Delay=½(Round Trip Bluetooth Transmission Time)+(Audio Processing Time).

In an embodiment described in the present application, each of the one or more Bluetooth devices is assigned a value for the second delay that is inversely proportional to the calculated lag delay for each one of the one or more Bluetooth devices. Additionally, the first delay for outputting the A/V data to the video sink device is assigned a value that is equal to the longest lag delay calculated for the Bluetooth devices. Additionally, at least two of the Bluetooth devices are assigned different values for the second delay, and the Bluetooth device having the longest lag delay is assigned a value of zero for the second delay.

In embodiments described in the present application, a method and algorithm are implemented to achieve synchronization between video data executed on a video sink device and audio data executed on one or more Bluetooth devices.

The method and algorithm include receiving A/V content from an A/V content provider, and decoding the A/V content to obtain video data and audio data. The method and algorithm output the A/V data to the video sink device and wirelessly communicate information with the one or more Bluetooth devices according to a wireless protocol, which includes the audio data. The method and algorithm obtain first or second calibration information for the one or more Bluetooth devices, determine a first delay for outputting the A/V data to the video sink device using the calibration information, control the Bluetooth transceiver to output the audio data to the one or more Bluetooth devices, and control the output circuit to output the A/V data to the video sink device in accordance with the first delay.

In embodiments described in the present application, the method and algorithm include controlling the output of a calibration animation that is displayed on the video sink device and controlling the output of a calibration audio signal to be executed on the one or more Bluetooth devices. Additionally, the method and algorithm include receiving an IR signal from a remote electronic or receiving input instructions from a user interface, wherein the IR signal from the remote electronic device or the input instructions from the user interface includes a command signal for synchronizing the calibration animation displayed on the video sink device with the calibration audio signal executed on the one or more Bluetooth devices. The command signal is used by the controller as the first calibration information for determining the first delay for outputting the A/V data to the video sink device.

In embodiments described in the present application, the method and algorithm control the output of a time marker message and an audio clip to the one or more Bluetooth devices. The responses received from the one or more Bluetooth devices include a first response with information on a round-trip transmission time between the electronic apparatus and the one or more Bluetooth devices, and a second response with information on an audio processing time by the one or more Bluetooth devices of the audio clip. The first and second responses from the one or more Bluetooth devices are used as the second calibration information for determining the first delay for outputting the A/V data to the video sink device.

In embodiments described in the present application, the method and algorithm use the first and second responses from the one or more Bluetooth devices to calculate a lag delay for each of the one or more Bluetooth devices, compare the lag delays of all the one or more Bluetooth devices, and determine a second delay for outputting the audio data to each of the one or more Bluetooth devices.

The method and algorithm assign each of the one or more Bluetooth devices a value for the second delay that is inversely proportional to the calculated lag delay for each one of the one or more Bluetooth devices. The first delay for outputting the A/V data to the video sink device is assigned a value that is equal to the longest lag delay calculated for the Bluetooth device. Additionally, at least two of the Bluetooth devices are assigned different values for the second delay, and the Bluetooth device having the longest lag delay is assigned a value of zero for the second delay.

In an embodiment described in the present application, a non-transitory computer-readable recording medium has recorded thereon a program embodying the features of the method/algorithm discussed above.

DETAILED DESCRIPTION

Figure 1:
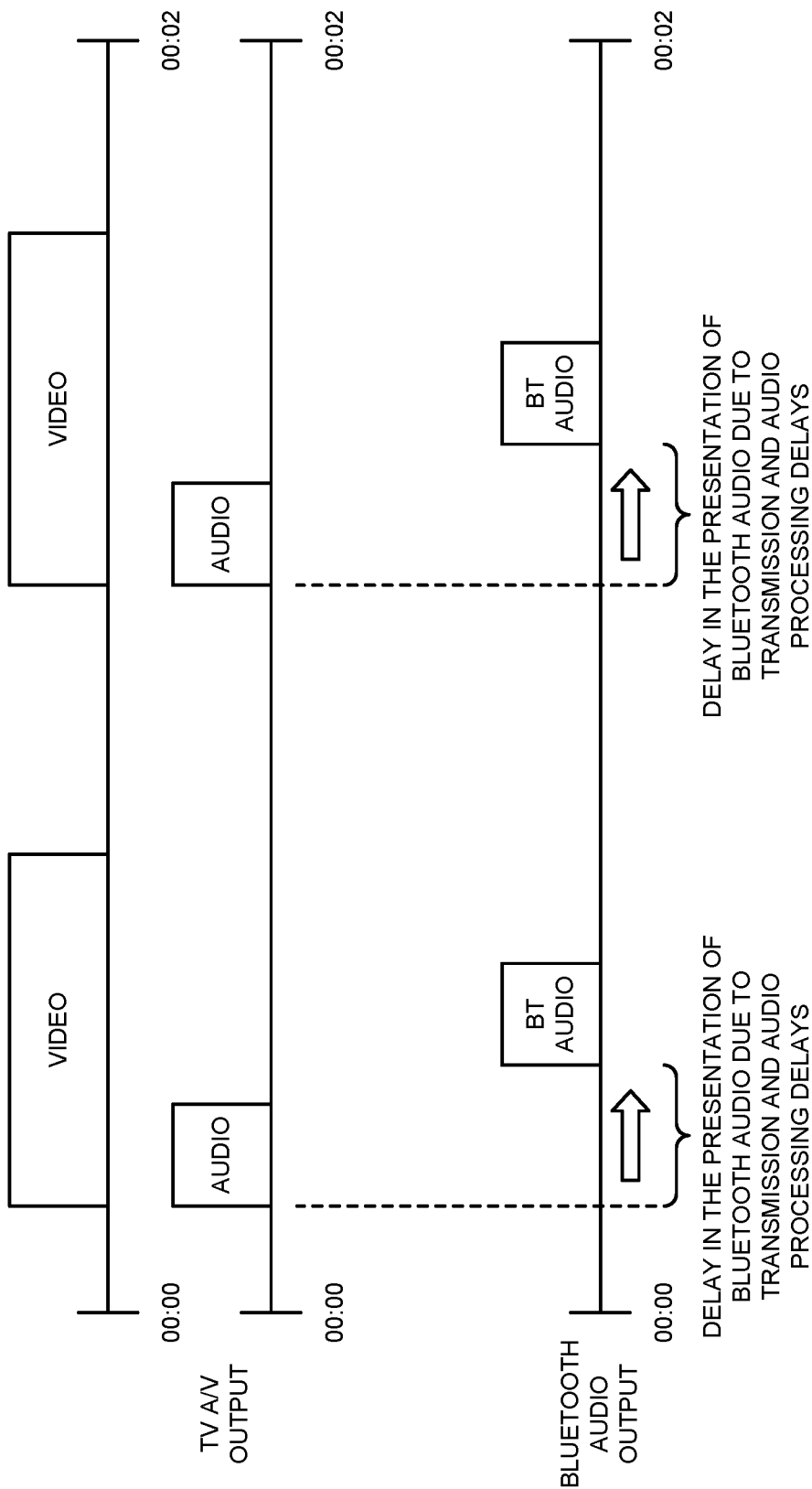
FIG. 1 is a diagram illustrating a synchronization issue between video data and audio data when using a Bluetooth device.

FIG. 1 is a diagram illustrating synchronization issues between video data and audio data when using Bluetooth audio devices (hereafter Bluetooth devices). As shown in FIG. 1, there is a noticeable delay between the audio data being output by the Bluetooth device and the audio/video (A/V) data being output by the television (TV) (e.g., video sink device), after receiving A/V data from, for example, a set-top box. The A/V content to the set-top box can be provided by service providers including cable television providers, satellite television providers, internet service providers, and multiple system operators.

The synchronization problem between video data and audio data when using a Bluetooth device arises because there are primary and secondary delays associated with using the Bluetooth device, which causes noticeable and annoying lip-sync problems between the video data displayed on the TV and the audio data being output by the Bluetooth device. The primary delays are related to transmitting the audio data using a Bluetooth protocol and the secondary delays are related to the Bluetooth devices processing the audio data.

For example, a user may be using a Bluetooth device (e.g., Bluetooth sound bars, Bluetooth headphones or other Bluetooth audio sink device such as a mobile phone, tablet or the like having Bluetooth capability) to listen to audio data related to video data or content (e.g., television programming and movies) being displayed on the TV. Due to the primary and secondary delays associated with using the Bluetooth device, there can be a mismatch between the audio data being listened to and the video data being displayed by the TV (i.e., lip-sync problem). Thus, there is a need to address the synchronization problem between video data and audio data when using a Bluetooth device.

Figure 2:
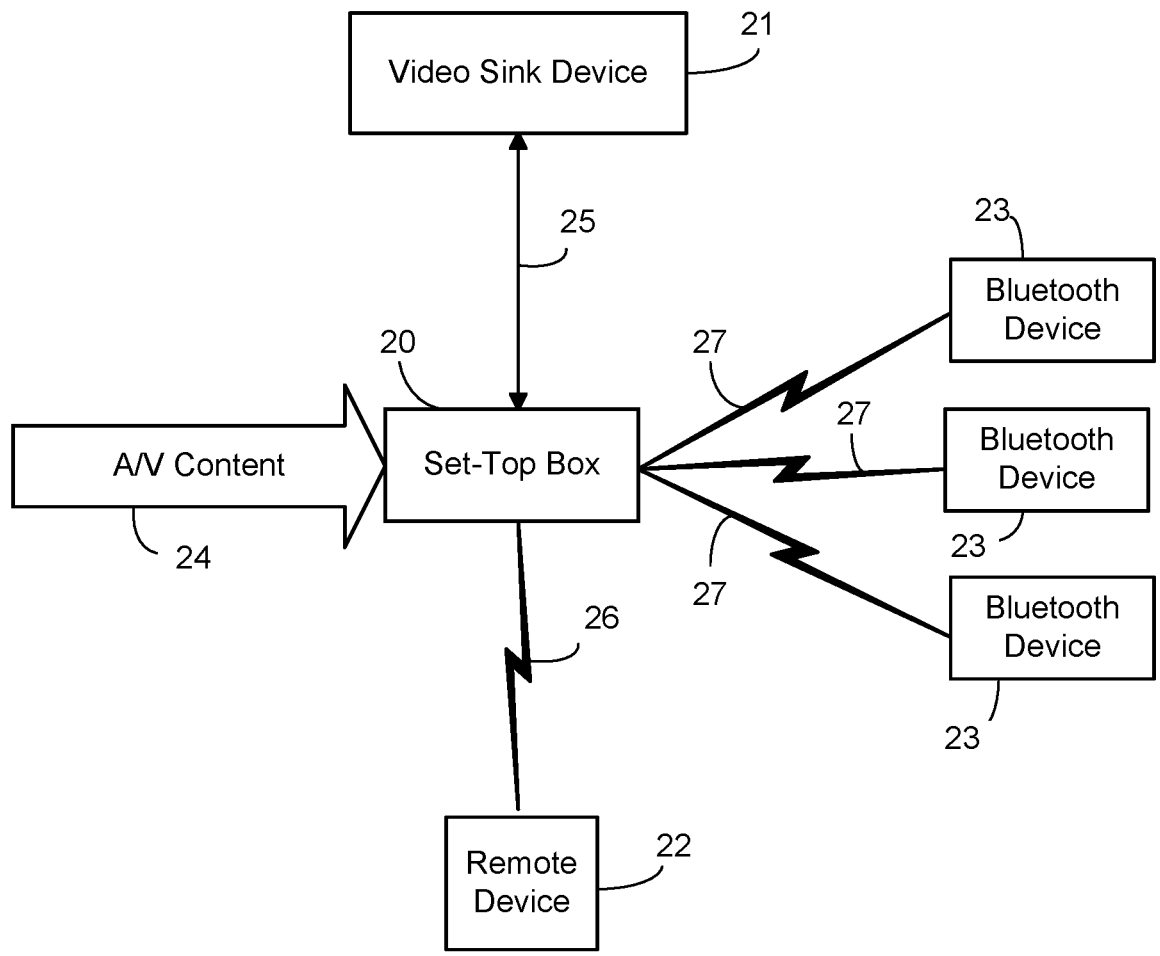
FIG. 2 is a block diagram showing an exemplary system for achieving synchronization between video data and audio data when using Bluetooth devices according to the present invention.

FIG. 2 is a block diagram showing an exemplary system for achieving synchronization between video data and audio data when using a Bluetooth device.

As shown in FIG. 2, the system includes a set-top box 20, a video sink device 21, a remote control device (e.g., an electronic remote control) 22, and a Bluetooth device 23. For ease of discussion, FIG. 2 refers to a stand-alone set-top box, but the present disclosure is not intended to be limited only to this type of set-top box and alternatively the set-top box 20 can be integrated directly into a consumer device such as a television, computer, or any other consumer device, such as electronically equipped appliances.

Figure 3:
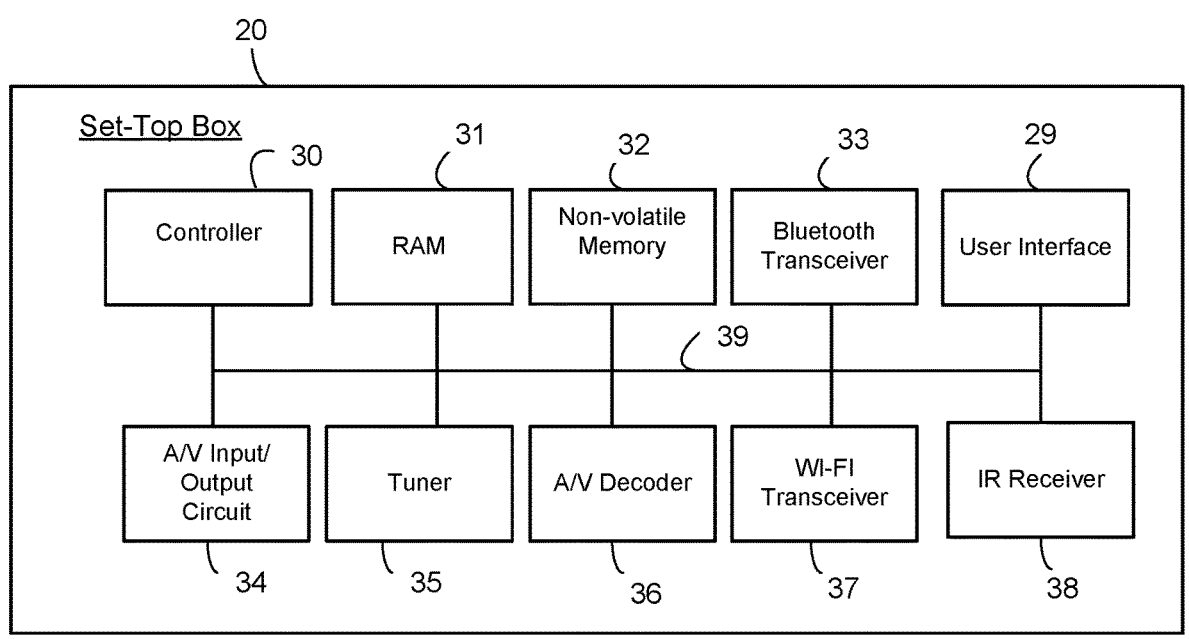
FIG. 3 is a block diagram showing an exemplary set-top box for achieving synchronization between video data and audio data when using Bluetooth devices according to the present invention.

The set-top box 20 houses components and circuits (e.g., as shown in FIG. 3) that convert the A/V content 24 to the set-top box 20 into audio and video (A/V) data that is usable by the video sink device 21 and the Bluetooth device 23. For example, the A/V content 24 to the set-top box 20 may be provided by service providers including cable television providers, satellite television providers, internet service providers, and multiple system operators; and the A/V content may include, but is not limited to, television programming and movies. The operation of the components and circuits of the set-top box 1 will be discussed in more detail with reference to FIG. 3.

The video sink device 21 may include, but is not limited to, a television, a computer, a portable device, an electronic tablet, a smart phone and other consumer electronic device capable to executing and displaying A/V data received from the set-top box 20. On the other hand, the Bluetooth devices 23 may include, but are not limited to, Bluetooth sound bars, Bluetooth headphones or other Bluetooth devices such as a smart phone, electronic tablet, televisions, computers, portable electronic devices, or other consumer electronic devices capable of communicating data with the set-top box 20 using a Bluetooth protocol. Each Bluetooth device 23 includes components and circuits (e.g., as show in FIG. 4) that decode and execute the audio data received from the set-top box 20. The operation of the components and circuits of each Bluetooth device 23 will be discussed in more detail with reference to FIG. 4.

The A/V content 24 received by the set-top box 20 is decoded to obtain the audio and the video data (A/V) data, and the A/V data is provided to the video sink device 21 via communication connection 25. The communication connection 25 between the video sink device 21 and the set-top box 20 can be a wired connection. The communication connection 25 may include, for example, a digital media interface (DMI), high-definition multimedia interface (HDMI) or other audio/video interface for transferring video data and digital audio data from an HDMI-compliant source device. Although the communication connection 25 is described as a wired connection, the communication connection 25 may also be a wireless connection that operates in accordance with, but is not limited to, IEEE802.11 protocol, a Radio Frequency For Consumer Electronics (RF4CE) protocol, ZigBee protocol, and/or IEEE802.15.4 protocol.

The audio data obtained by decoding the A/V content 24 received by the set-top box 20 is also provided to each of the Bluetooth devices 23 via the communication connections 27. The communication connections 27 between the set-top box 20 and each of the Bluetooth devices 23 are wireless connections that operate in accordance with a Bluetooth protocol. That is, the communication connections 27 operate in accordance with a wireless technology standard for exchanging data over short distances using short-wavelength Ultra high frequency (UHF) radio waves from 2.4 to 2.485 GHz. For example, data can be exchanged between the step-top box 20 and the Bluetooth devices 23 via the communication connections 27 at a rate of approximately 1-2 megabits per second and at a range of approximately 1-30 meters. However, the data rate and distance for exchanging data between the set-top box 20 and the Bluetooth devices 23 may vary depending on the generation of Bluetooth technology being implemented.

The remote device 22 also communicates wirelessly with the set-top box 20 using a wireless communication connection 26. The remote device 22 may be a stand-alone remote control, or any electronic device that can be implemented as a remote control for communicating data with the set-top box 20 using an Infrared (IR) signal or protocol sent via the communication connection 26. Although the remote device 22 is described as a remote control device using an IR signal or protocol, it is contemplated by the invention that other remote control devices could be implemented that use protocols such as, but not limited to, Bluetooth Audio/Video Remote Control Profile (AVRCP), RF4CE, ZigBee, Wi-Fi, and Z-Wave.

After receiving the A/V content 24 at the set-top box 20, the A/V content 24 is decoded by the set-top box 24, and the A/V data is transmitted to the video sink device 21 and the audio data is transmitted to one or more Bluetooth devices 23. A user of the Bluetooth device 23 can then watch the A/V content such as television programming and movies on the video sink device 21 while listening to the audio data on the Bluetooth devices 23. To address the lip-sync problem between the audio data listen to on the Bluetooth device 23 and video data watched on the video sink device 21, the set-top box 20 implements a manual and an automatic calibration for achieving synchronization between video data watched on the video sink device 21 and audio data listen to on the Bluetooth device 23. A detailed discussion of the manual calibration and the automatic calibration for achieving synchronization between video data watched on the video sink device 21 and audio data listened to on a Bluetooth device 23 will be discussed in more detail with reference to FIGS. 5-10.

FIG. 3 is a block diagram showing an exemplary set-top box 20 for achieving synchronization between video data and audio data when using Bluetooth devices. As shown in FIG. 3, the set-top box 20 includes a communication bus 39 through which various components in the set-top box 20 are connected for communicating data there between and for converting input A/V content 24 to the set-top box 20 into A/V data usable by the video sink device 21 and a Bluetooth device 23. The components of the set-top box 20 include a controller 30, a random access memory (RAM) 31, a non-volatile memory 32, a Bluetooth transceiver 33, a user interface 29, an A/V input/output circuit 34, a tuner 35, an A/V decoder 36, a Wi-Fi transceiver 37, and an Infrared (IR) receiver 38.

The controller 30 may be a dedicated controller, CPU, microprocessor, etc., capable of controlling the operation of the components and circuits of the set-top box 20. The RAM 31 may be implemented as a working memory for the controller 30, and the non-volatile memory 32 can be provided for storage of program code, user A/V content, determined or calculated delay information, and other data. The Bluetooth transceiver 33 transmits data to and receives data from the Bluetooth device 23 in accordance with a Bluetooth protocol. Similar to the Bluetooth devices 23, the Bluetooth transceiver 33 operates in accordance with a wireless technology standard for exchanging data over short distances using short-wavelength UHF radio waves from 2.4 to 2.485 GHz.

Communications between the Bluetooth transceiver 33 and the Bluetooth devices 23 can be point-to-point or multipoint. Additionally, the data can be exchanged between the Bluetooth transceiver 33 and the Bluetooth devices 23 at, for example, a data rate of approximately 1-25 megabit per second and at a range of approximately 1-30 meters. However, the data rate for exchanging data and the distance for exchanging data between the Bluetooth transceiver 33 and the Bluetooth devices 23 may vary depending on the generation of Bluetooth technology being implemented in the Bluetooth transceiver 23 and the Bluetooth devices 23.

The user interface 29 provides a means for inputting instructions directly to the set-top box 20. The user interface 29 may include, but is not limited to, keys, buttons, knobs, or other similar input device that can be used to input instructions for controlling operations on the set-top box 20 and/or the video sink device 21. The A/V input/output circuit 34 includes one or more connectors, such as RF connectors or Ethernet connectors. One of the connectors of the A/V input/output circuit 34 can be connected to a content provider, such as a multiple system operator (MSO), by terrestrial antenna, satellite dish, or wired cable. Through this connector of the A/V input/output circuit 34, the set-top box 20 receives the A/V content 24 from the content provider. Additionally, one of the connectors of the A/V input/output circuit 34 can be used to send data to the content provider.

The tuner 35 can select a desired channel from the received A/V content 24 based on the input instruction by the user either through a button or buttons of the user interface 20 on the set-top box 20 or via IR signal received from the remote device 22. The signal of the selected channel is decoded by the A/V decoder 36. The A/V decoder 36 decodes the selected signal so that the A/V content is usable by the video sink device 21 and the Bluetooth devices 23. The A/V input/output circuit 34 can also include a connector that is to be connected to the user's video sink device 21, such as a television, for displaying A/V content received by the set-top box 20 and decoded by the A/V decoder 36. Additionally, the set-top box 20 can provide the A/V data according to Internet Protocol Television (IPTV), in which the tuner 35 may be omitted.

The Wi-Fi transceiver 37 is, for example, a Wi-Fi WLAN interface radio transceiver, or an in-home LTE (Long Term Evolution) transceiver that outputs signals of the selected channel to a wireless user device. The wireless output from the Wi-Fi transceiver can be in place of or in addition to the wired output by the A/V input/output circuit 34. The A/V content 24 from the service provider can be received by a separate electronic device, such as a cable modem, or a different set-top box, and communicated to the set-top box 20 wirelessly via the Wi-Fi Transceiver 37. The IR receiver 38 communicates IR signals with the remote device 22, and the IR signal may include data that can be used by the controller 30 to control operations of the components and circuits of the set-top box 20. Although the set-top box 20 is described as implementing the use of an IR receiver 38, it is contemplated by the invention that other types of receivers could be implemented that use protocols such as, but not limited to, Bluetooth AVRCP, RF4CE, ZigBee, Wi-Fi, and Z-Wave.

Figure 4:
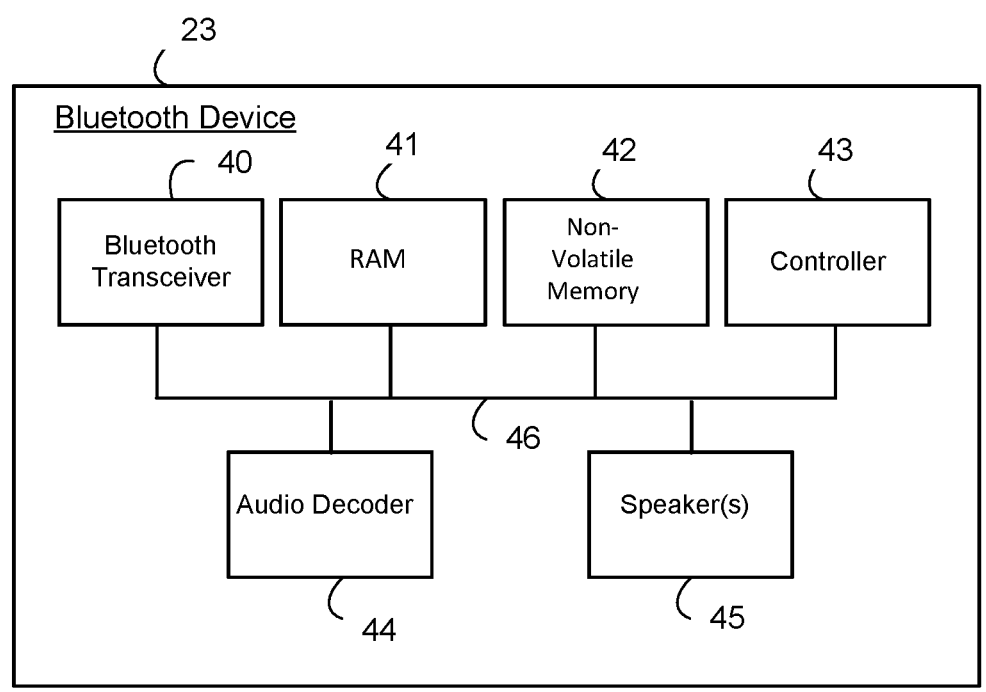
FIG. 4 is a block diagram showing an exemplary Bluetooth device according to the present invention.

FIG. 4 is a block diagram showing an exemplary Bluetooth device 23. As shown in FIG. 4, each Bluetooth device 23 includes a communication bus 46 through which various components in the Bluetooth device 23 are connected for communicating data there between. The components of the Bluetooth device 23 include a Bluetooth transceiver 40, a random access memory (RAM) 41, a non-volatile memory 42, a controller 43, an audio decoder 44 and a speaker or speakers 45. The Bluetooth transceiver 40 transmits data to and receives data from the Bluetooth transceiver 33 of the set-top box 20 in accordance with a Bluetooth protocol. The Bluetooth transceiver 40 operates in accordance with a wireless technology standard for exchanging data over short distances using short-wavelength UHF radio waves from 2.4 to 2.485 GHz.

Similar to the Bluetooth transceiver 33 of the set-top box, the data can be exchanged between the Bluetooth transceiver 40 and the Bluetooth transceiver 33 of the set-top box at a rate of approximately 1-25 megabit per second and at a range of approximately 1-30 meters. However, the data rate for exchanging data and the distance for exchanging data between the Bluetooth transceiver 40 and the Bluetooth transceiver 33 of the set-top box 20 may vary depending on the generation of Bluetooth technology being implemented in the Bluetooth transceivers 33, 40.

The RAM 41 may be implemented as a working memory for the controller 43, and the non-volatile memory 42 can be provided for storage of program code, audio data, ID data, and other information. The controller 43 may be a dedicated controller, CPU, microprocessor, etc., capable of controlling the operation of the components of the Bluetooth device 23. The audio decoder 44 decodes the signal received from the set-top box 20 so that the audio data is usable by the Bluetooth device 23. The audio data decoded by the audio decoder 44 can be converted into a corresponding sound and output by one or more speakers 45 of the Bluetooth device 23. That is, the speakers 45 are audio speakers that include an electroacoustic transducer, which can convert audio signal (e.g., an electrical audio signal) into a corresponding sound.

Figure 5:
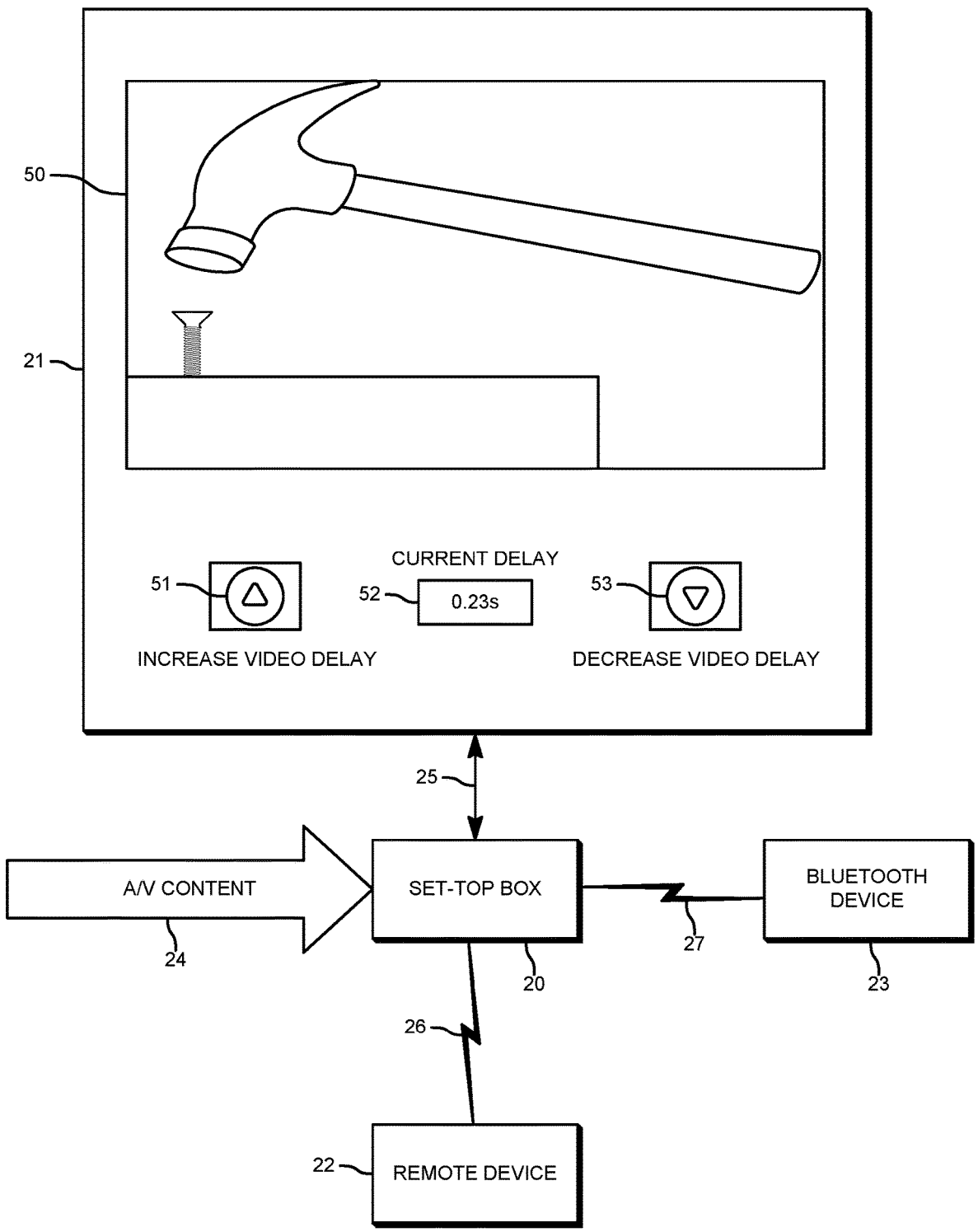
FIG. 5 is a block diagram showing in more detail an exemplary system for achieving manual synchronization between video data and audio data when using Bluetooth devices according to the present invention.
Figure 6:
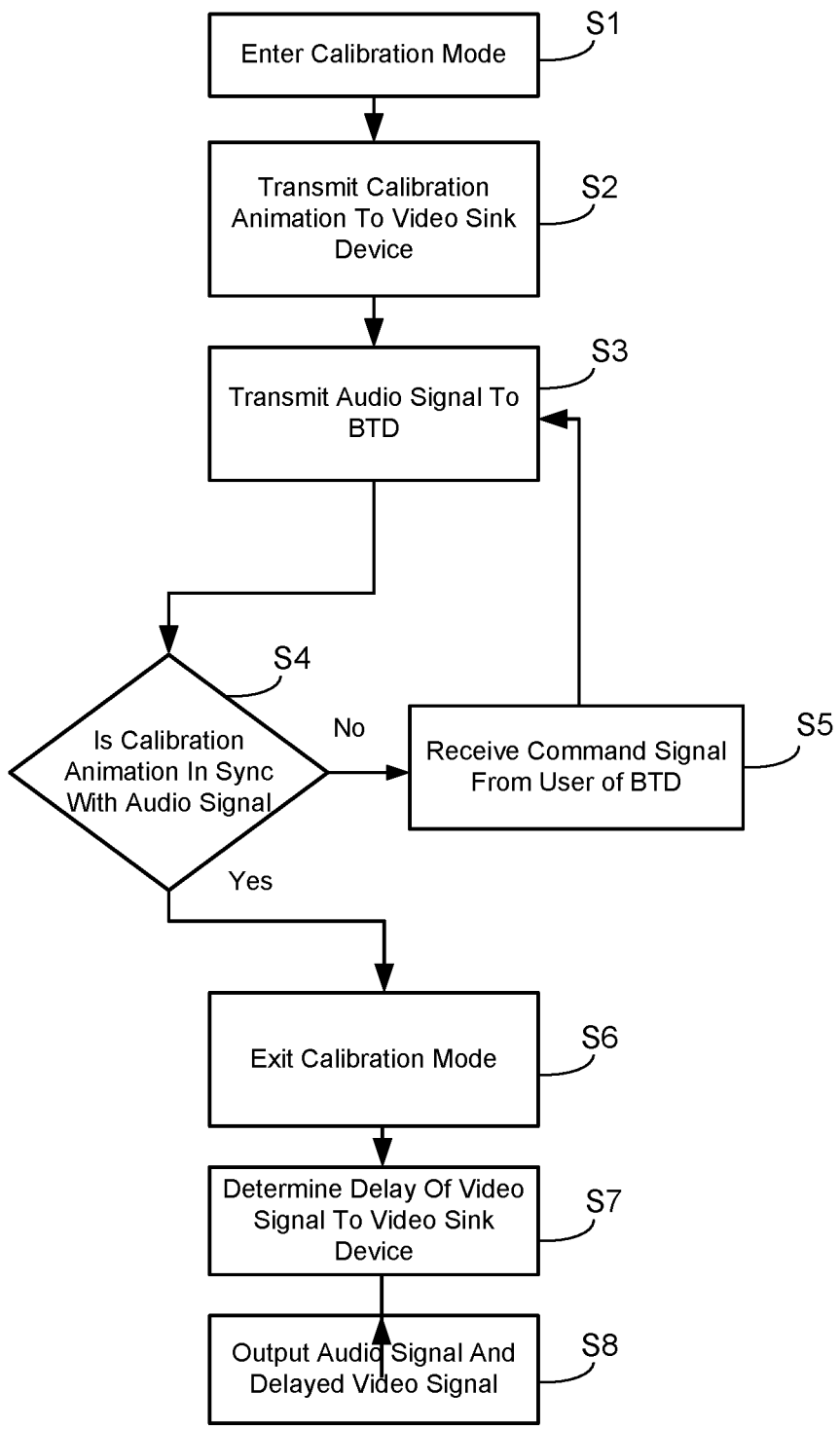
FIG. 6 is flow chart showing an exemplary algorithm and method for achieving manual synchronization between video data and audio data when using Bluetooth devices according to the present invention.

FIG. 6 is flow chart showing an exemplary algorithm and method for achieving manual synchronization between video data and audio data when using Bluetooth devices according to the present invention. The algorithm and method shown in FIG. 6 can be implemented in the exemplary system and set-top box 20 shown respectively in FIGS. 2, 3 and 5. For example, the method and algorithm can be implemented by a program stored in the RAM 31 or the non-volatile memory 32 and executed by the controller 30, such that the controller 30 controls the operations of the components and circuits of the set-top box 20 to perform operations of the method and algorithm.

Although the detailed operation of the components and circuits of the set-top box 20 and the Bluetooth devices 23 have already been described in detail with reference to FIGS. 2 and 3, the method and algorithm for performing the manual synchronization between video data and audio data when using Bluetooth devices 23 shown in FIG. 6 will be described with reference to some of the elements in FIGS. 2, 3, and 5.

As shown in FIG. 6, the manual operation for synchronization between video data and audio data when using Bluetooth devices can include the user first entering into a calibration mode, as shown in step S1. The user enters the calibration mode by making an input selection on the set-top box 20 either through pushing a button or buttons using the user interface 29 on the set-top box 20 or via IR signal received through the communication connection 26 from the remote device 22.

Once the user has entered the calibration mode, in step S2 the controller of the set-top box 20 controls the output of a graphical tool stored either in RAM 31 or the non-volatile memory 32 to the video sink device 21 through the communication connection 25, and the graphical tool is displayed on the video sink device 21. As shown in FIG. 5, the graphical tool is a moving animation 50 that illustrates a hammer hitting a nail. Although FIG. 5 illustrates a hammer hitting a nail 50, the type of animation stored in the set-top box 20 and used for calibration is not meant to be limited to one-type of animation, and can be any moving animation illustrating contact between objects, surfaces, or combination thereof. In step S3, the controller 30 of the set-top box 20 also controls the output of audio data corresponding to the animation 50 to the Bluetooth device 23 through the communication connection 27.

The user of a Bluetooth device 23 listens to the audio data received from the set-top box 20 and in step S4 determines if the moving animation 50 shown on the video sink device 21 (i.e., hammer hitting the nail) is synchronized with the audio data being listened to on the Bluetooth device 23. That is, contact between the hammer and the nail in the animation 50 should sufficiently correspond with the audio data (e.g., sound of hammer hitting a nail) listened to by the user on the Bluetooth device 23. If the audio data listened to by the user using the Bluetooth device 23 is not synchronized with the animation 50 shown on the video sink device 21, then in step S5 the user can send a command signal for either increasing or decreasing the delay of the animation 50. The user can send the command signal either through pushing a button or buttons using the user interface 29 on the set-top box 20 or via IR signal received through the communication connection 26 from the remote device 22.

For example, as shown in FIG. 5, the user of the Bluetooth device 23 can make selections 51, 53 on the calibration animation 50 in order increase 51 or decrease 53 the value of the delay 52 by sending the command signal. Steps S3-S5 can be repeated until acceptable synchronization is achieved between the moving animation 50 shown on the video sink device 21 (i.e., hammer hitting the nail) and the audio data listened to on the Bluetooth device 23.

As the delay is adjusted by the user of the Bluetooth device 23 (i.e., steps S3-S5), the delay value 52 is shown on the animation 50. Once the moving animation 50 shown on the video sink device 21 (i.e., hammer hitting the nail) is determined by the user of the Bluetooth device 23 to be synchronized with the audio data, in step S6 the user can exit the calibration mode. The user can exit the calibration mode using a similar method to that used to enter the calibration mode (e.g., an input instruction selection on the set-top box 20 either through pushing a button or buttons using the user interface 29 on the set-top box 20 or via IR signal received through the communication connection 26 from the remote device 22). In step S7, the controller 30 of the set-top box 20 determines that the value of the delay 52 set by the user in the animation 50 is the delay needed for synchronization and the delay is stored by the controller 30 in the RAM 31 or the non-volatile memory 32 of the set-top box 20.

In step S8, the controller 30 of the set-top 20 uses the stored delay as calibration information for delaying the output of the A/V data to the video sink device 21 in order to synchronize video data shown on the video sink device 21 with the audio data listened to on the Bluetooth device 23. For example, after the A/V content 24 is received by the set-top box 20, the audio data is output to the Bluetooth device 23 via the communication connection 27 without delay and the A/V data is output to the video sink device 21 via communication connection 25, but only after applying the delay (e.g., 0.23 sec shown in FIG. 5) stored in the RAM 31 or non-volatile memory 32.

By implementing the manual calibration method and algorithm described above, the user can watch the A/V content such as television programming and movies on the video sink device 21 while listening to the audio data on the Bluetooth device 23. By applying delay stored in the RAM 31 or non-volatile memory 32 to the A/V data output to the video sink device 21, the lip-sync problem between the audio data listen to on the Bluetooth device 23 and video data watched on the video sink device 21 is avoided.

Figure 7:
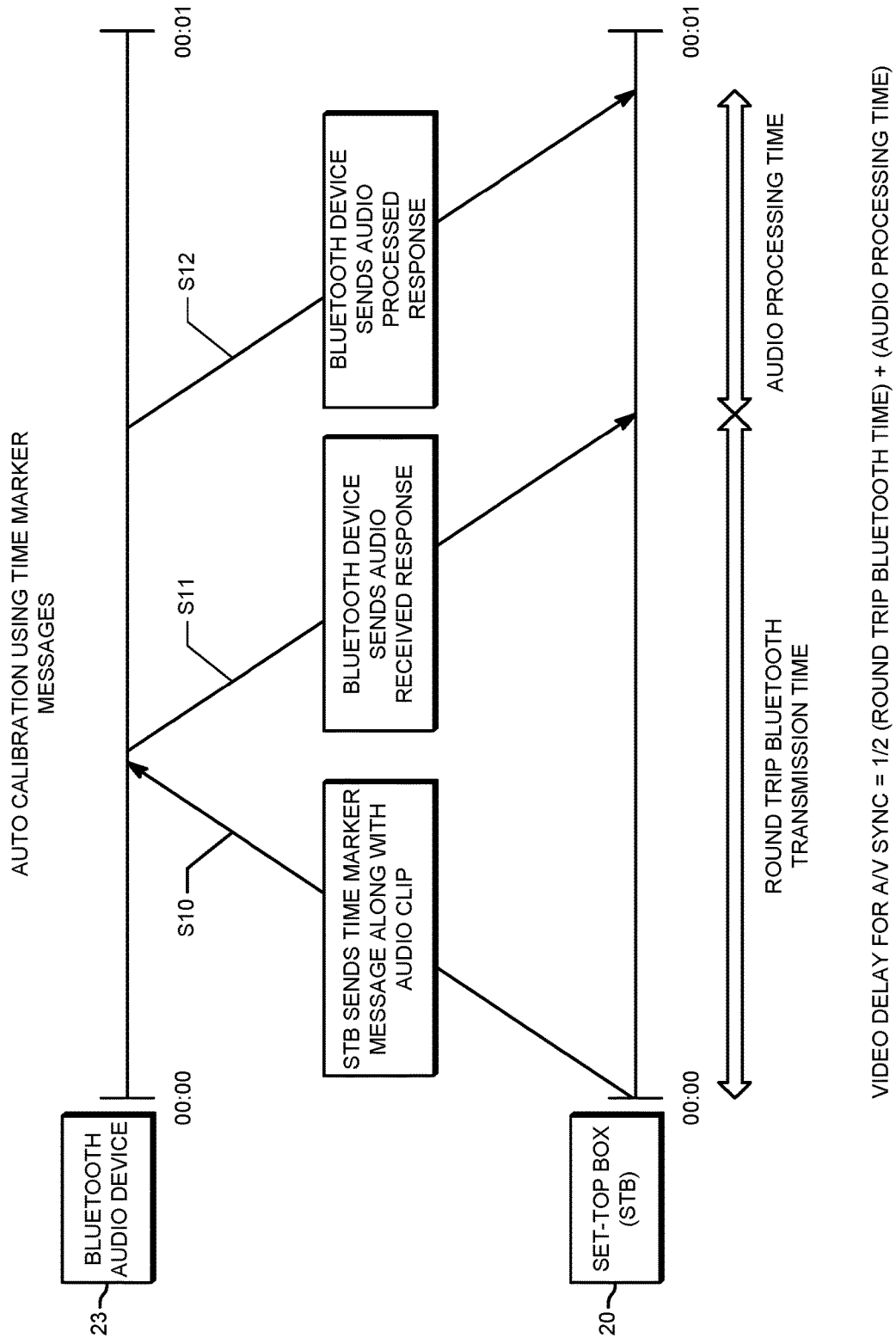
FIG. 7 is a flow diagram showing another exemplary algorithm and method for achieving automatic synchronization between video data and audio data when using Bluetooth devices according to the present invention.
Figure 8:
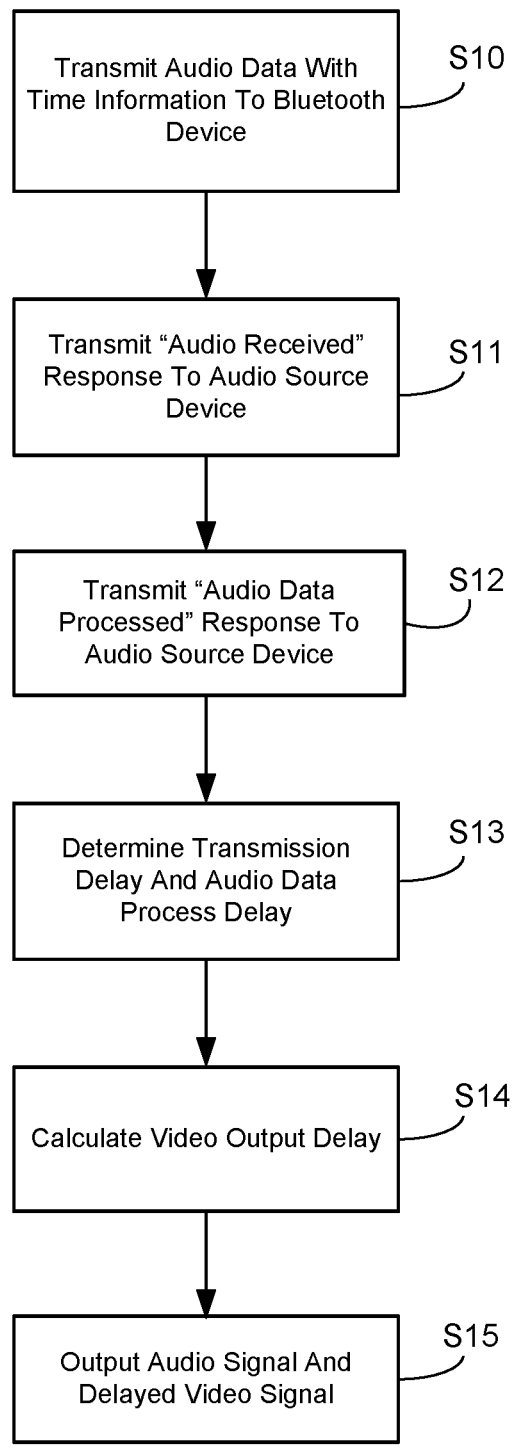
FIG. 8 is a flow chart showing in more detail the other exemplary algorithm and method for achieving automatic synchronization between video data and audio data when using Bluetooth devices according to the present invention.

FIGS. 7 and 8 are flow diagrams showing an exemplary algorithm and method for achieving automatic synchronization between video data and audio data when using Bluetooth device according to the present invention. The algorithm and method shown in FIGS. 7 and 8 can be implemented in the exemplary system and set-top box 20 shown respectively in FIGS. 2 and 3. For example, the method and algorithm can be implemented by a program stored in the RAM 31 or the non-volatile memory 32 and executed by the controller 30, such that the controller 30 controls the operations of the components and circuits of the set-top box 20 to perform operations of the method and algorithm. Although the detailed operation of the components and circuits of the set-top box 20 and the Bluetooth devices 23 have already been described in detail with reference to FIGS. 2 and 3, the method and algorithm for performing the automatic synchronization between video data and audio data when using Bluetooth devices 23 shown in FIGS. 7 and 8 will be described with reference to some of the elements in FIGS. 2 and 3.

As shown in step S10, the controller 30 of the set-top box 20 transmits audio data and a timer marker message to the Bluetooth device 23 via the communication connection 27. The audio data and timer marker message implemented by the set-top box 20 can be stored in the RAM 31 or the non-volatile memory 32 of the set-top box 20. The audio data can be a small amount of sound data (e.g., chirp, beep or audio clip) and the time marker message can be time information such as a time stamp or other time information that indicates the time at which the audio data is transmitted from the set-top box 20 to the Bluetooth device 23.

Once the Bluetooth device 23 receives the audio data and the time mark message from the set-top box 21, in step S11 the controller 43 of the Bluetooth device 23 transmits an "Audio Received" response to the set-top box 20. In step S12, the controller 43 of the Bluetooth device 23 also transmits an "Audio Data Processed" response to the set-top box 20, after processing the audio data received by the set-top box 20.

In step S13, the controller 30 of the set-top box 20 uses the time difference between initial transmission of the audio data and receipt of the "Audio Received" response from the Bluetooth device 23 as an indication of "a round-trip transmission time" between the set-top box 23 and the Bluetooth device 23. Additionally, the controller 30 of the set-top box 20 uses the time difference between the initial transmission of the audio data from the set-top box 20 and receipt of the "Audio Data Processed" response from the Bluetooth device 23 as an indication of data processing time of data by the Bluetooth device 23. In step S14, the controller 30 of the set-top box 20 uses both responses (i.e., first and second responses) from the Bluetooth device 23 as calibration information for calculating the delay for outputting the A/V data to the video sink device 21. In this case, the delay for outputting the A/V data to the video sink device 21 is determined using the formula: Delay=½(Round Trip Bluetooth Transmission Time)+(Audio Processing Time).

The delay value is stored in the RAM 31 or the non-volatile memory 32 of the set-top box 20. In step S15, the controller 30 of the set-top 20 uses the stored delay as calibration information for delaying the output of the A/V data to the video sink device 21 in order to synchronization video data shown on the video sink device 21 with the audio data listened to on the Bluetooth device 23. For example, after the A/V content 24 is received by the set-top box 20, the audio data is output to the Bluetooth device 23 via the communication connection 27 without delay and the A/V data is output to the video sink device 21 via communication connection 25, but only after applying the delay stored in the RAM 31 or non-volatile memory 32.

By implementing the automatic calibration described above, the user can watch the A/V content such as television programming and movies on the video sink device 21 while listening to the audio data on the one or more Bluetooth devices 23. By applying delay stored in the RAM 21 or non-volatile memory 32 to the A/V data output to the video sink device 21, the lip-sync problem between the audio data listen to on the Bluetooth device 23 and video data watched on the video sink device 21 is avoided.

Figure 9:
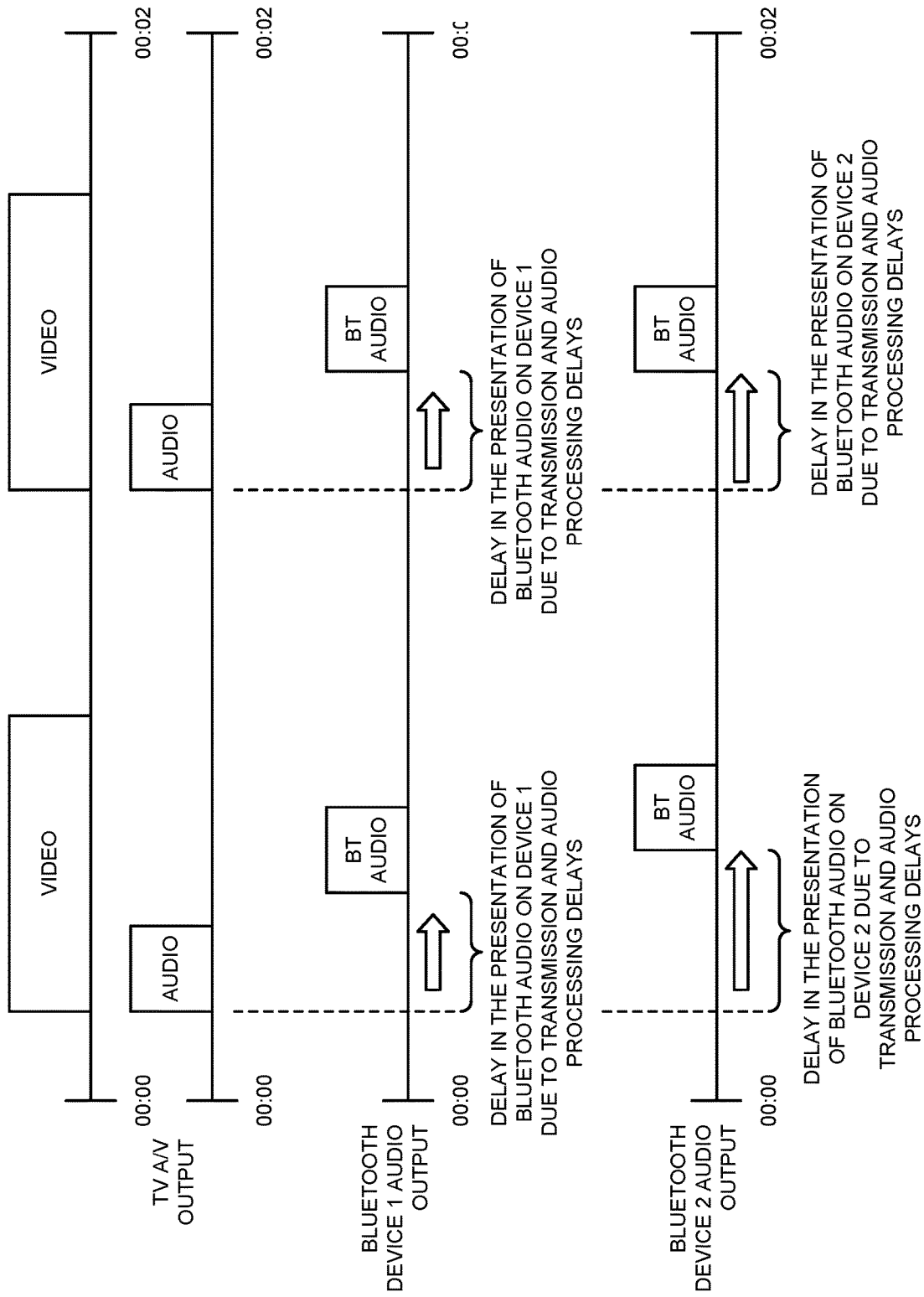
FIG. 9 is a diagram illustrating synchronization issues between video data and audio data when Bluetooth devices have different lag delays.

FIG. 9 is a diagram illustrating synchronization issues between video data and audio data when there are multiple Bluetooth devices have different delays. As discussed previously with reference to FIG. 1, synchronization problems between video data displayed on a TV (i.e., video sink device) and audio data listened to on a Bluetooth device 23 arise because there is a time delay in the processing and output of the audio data (e.g., primary and secondary delays) from the Bluetooth device, which causes noticeable and annoying lip-sync problems.

As shown in FIG. 9, Bluetooth device 1 and Bluetooth device 2 not only have similar primary and secondary delay issues with respect to the presentation of A/V data by the TV described with reference to FIG. 1, but also have the added problem of having different primary and secondary delays with respect to each other. That is, Bluetooth device 2 has more of a delay in the presentation of the audio data (with respect to the A/V data presented on the TV) than Bluetooth device 1. Thus, there is a need to address the additional lip-sync problems created when using multiple Bluetooth devices have different primary and secondary delays with respect to each other.

Figure 10:
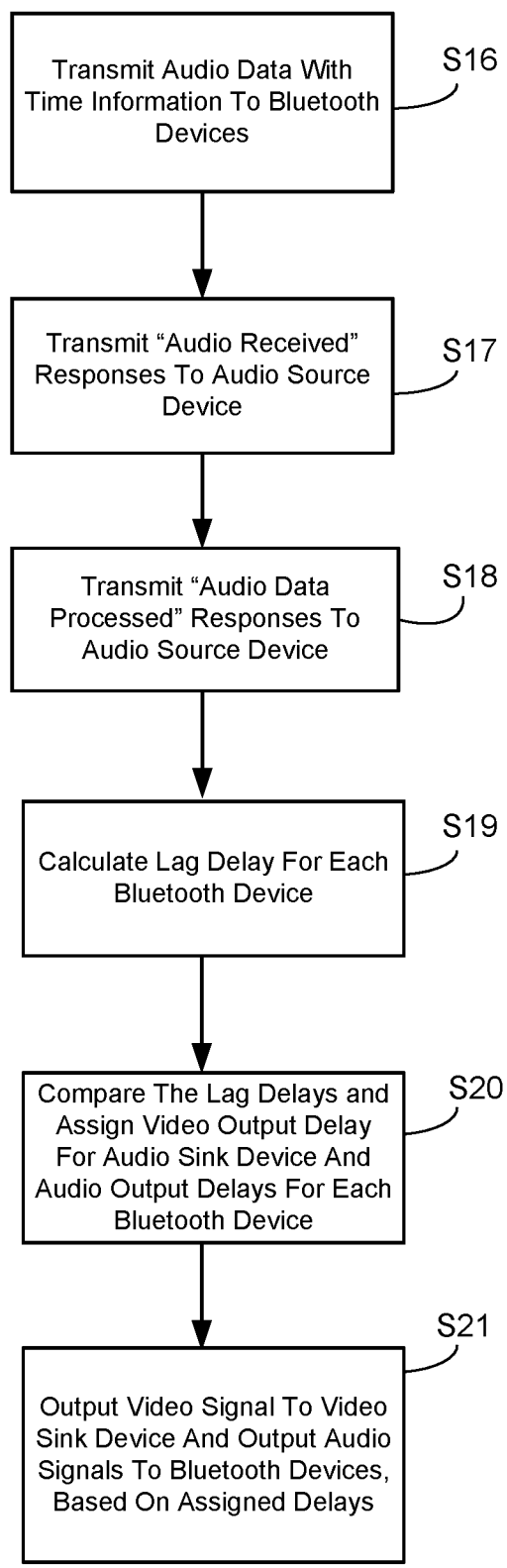
FIG. 10 is a flow chart showing an exemplary algorithm and method for achieving automatic synchronization between video data and audio data when using Bluetooth devices having different lag delays according to the present invention.

FIG. 10 is a flow chart showing an exemplary algorithm and method for achieving automatic synchronization between video data and audio data when using multiple Bluetooth devices having different primary and secondary delays (i.e., hereafter referred to as "lag delay") according to the present invention. The algorithm and method shown in FIG. 10 can be implemented in the exemplary system and set-top box 20 shown respectively in FIGS. 2 and 3. For example, the method and algorithm can be implemented by a program stored in the RAM 31 or the non-volatile memory 32 and executed by the controller 30, such that the controller 30 controls the operations of the components and circuits of the set-top box 20 to perform operations of the method and algorithm.

Although the detailed operation of the components and circuits of the set-top box 20 and the Bluetooth devices 23 have already been described in detail with reference to FIGS. 2 and 3, the method and algorithm for performing the automatic synchronization between video data and audio data when using multiple Bluetooth devices shown in FIG. 10 will be described with reference to some of the elements in FIGS. 2 and 3.

In step S16, the controller 30 of the set-top box 20 transmits audio data and a timer marker message to each of the Bluetooth devices 23. The audio data and timer marker message can be stored in the RAM 31 or the non-volatile memory 32 of the set-top box 20. The audio data can be small amount of sound data (e.g., chirp, beep or audio clip) and the time marker message can be time information such as a time stamp or other time information that indicates the time at which the audio data is transmitted from the set-top box 20 to each of the Bluetooth devices 23.

Once each Bluetooth device 23 receives the audio data and the time mark message from the set-top box 20, in step S17 the controller 43 of each Bluetooth device 23 transmits an "Audio Received" response back to the set-top box 20. The controller 30 of the set-top box 20 use the time difference between initial transmission of the audio data and receipt of the "Audio Received" response from each of the Bluetooth devices 23 as an indication of "round-trip transmission time" between the set-top box 20 and each of the Bluetooth devices 23 via the communication connections 27. In step S18, the controller 43 of each of the Bluetooth devices 23 then transmits and "Audio Data Processed" response to the set-top box 20, after each Bluetooth device has processed the audio data transmitted by the set-top box 20.

The controller 30 of the set-top box 20 uses the time difference between the initial transmission of the audio data from the set-top box 20 and receipt of the "Audio Data Processed" response from each Bluetooth device 23 as an indication of the data processing time of audio data by each Bluetooth device 23. In step S19, the controller 30 of the set-top box 20 uses the responses (i.e., the first response "Audio Received" and second response "Audio Data Processed") from the Bluetooth device 23 for determining the lag delay for each Bluetooth device 23. For example, the controller 30 of the set-top box 20 uses the following formula for determining the lag delay for each Bluetooth device 23: Lag Delay=½(Round Trip Bluetooth Transmission Time)+(Audio Processing Time).

In step S20, the controller 30 compares the calculated lag delays and determines a delay for outputting the A/V data to the audio sink device 21 (e.g., TV) via communication connection 25 (hereafter "first delay") and a delay for outputting the audio data to each of the Bluetooth devices 23 via communication connection 27 (hereafter "second delay"). For example, in the case of having three Bluetooth devices 23, assume the controller 30 calculates the lag delays for the three Bluetooth devices (e.g., as in step S19) based on the responses received (e.g. as in steps S17 and S18) from each of the Bluetooth devices 23. In this example, the Bluetooth devices 23 have the following calculated lag delays: 1) the first Bluetooth device has a calculated lag delay of 0.5 sec; 2) the second Bluetooth device 23 has a calculated lag delay of 0.35 sec; 3) and the third Bluetooth device 23 has a calculated lag delay of 0.15 sec.

The controller 30 of the set-top box 20 compares the lag delays (e.g., 0.5 sec, 0.35 sec, and 0.15 sec), and determines the assignment of the first delay for the audio sink device 21 and the second delay for each Bluetooth device 23. Specifically, the controller 30 of the set-top box 20, based on a comparison of all the calculated lag delays, determines the longest calculated lag delay among the Bluetooth devices 23, and then assigns a value for the second delay to each of the Bluetooth devices 23 by taking the difference between the longest calculated lag delay (e.g. Bluetooth device 1) and the other calculated lag delays (e.g., Bluetooth devices 2 and 3), such that the second delay for each of the Bluetooth devices 23 is inversely proportional to the calculated lag delay for each Bluetooth device 23. For example, the Bluetooth device 23 having the longest lag delay will be assigned the shortest second delay by the controller 30.

In this example, the controller 30 would determine that the Bluetooth device 23 with the 0.5 sec lag delay has the longest lag delay among the three Bluetooth devices 23. Thus, the second delay for each of the Bluetooth devices 23 would be assigned by the controller 30 as follows:

Bluetooth Device 2: (0.5 sec)–(0.35 sec)=0.15 sec second delay;

Bluetooth Device 3: (0.5 sec)–(0.15 sec)=0.35 sec second delay;

Bluetooth Device 3: (0.5 sec)–(0.5 sec)=0.0 sec second delay.

The controller 30 would also assign a first delay to the audio sink device 21 that is equal to the longest lag delay. That is, controller 30 would assign a first delay to the audio sink device 21 of 0.5 sec, which is equal to the lag delay of Bluetooth device 23 will the longest lag delay (i.e., Bluetooth device 1). The lag delay values, the first delays and the second delays can be stored in the RAM 31 or non-volatile memory 32 of the set-top box 20 for use by the controller 30.

In step S21, the set-top 20 uses the stored delays as calibration information for outputting the A/V data to the video sink device 21 and for outputting the audio data to the Bluetooth devices 23 in order to achieve synchronization between the video data shown on the video sink device 21 and the audio data listened to on all the Bluetooth devices 23. For example, after the A/V content 24 is received by the set-top box 20, the audio data is output to the Bluetooth devices 23 via the communication connections 27 in accordance with the assigned second delay and the A/V data is output to the video sink device 21 via communication connection 25 according to the assigned first delay. By using the method and algorithm shown in FIG. 10, all the Bluetooth devices 23 can be synchronized with each other as well as with the video sink device 21. In the example provided above, three Bluetooth devices 23 were discussed. However, the method and algorithm shown in FIG. 10 can be implemented with any number of Bluetooth devices 23 receiving audio data from the set-top box 20.

In an alternative embodiment, the set-top box 20, instead of using responses (e.g., first and second response) from the Bluetooth devices 23 as described with reference to FIGS. 8 and 10, may apply a first delay to the audio sink device 21 based on the determination of an acceptable lip-sync tolerance range for the Bluetooth devices 23. In some cases, it may not be possible to receive lag delay information (e.g., primary and secondary delays) from a Bluetooth device for determining the appropriate first and/or second delays needed to determine acceptable synchronization between the A/V data displayed on the audio sink device 21 and the audio data listened to the Bluetooth devices 23.

In this case, the set-top box 20 can still provide a better listening experience for the users of the Bluetooth devices 23 by applying a first delay to the video sink device 21 that would result in the synchronization between the A/V data displayed on the audio sink device 21 and the audio data listened to the Bluetooth devices 23 (i.e., lip-sync) that falls within an acceptable lip-sync tolerance range. For example, the set-top box 20 may implement the use of a lip-sync tolerance range of between +40 milliseconds (ms) for an acceptable leading audio signal for the Bluetooth devices 23 and −120 ms for an acceptable lagging audio signal for the Bluetooth devices 23. That is, as long as the audio data listened to by the Bluetooth devices 23 falls within the acceptable lip-sync tolerance range, the user of the Bluetooth device 23 would experience acceptable synchronization between the A/V data displayed by the video sink device 21 and the audio data listened to by each of the Bluetooth devices 23.

For example, lets assume the set-top box 20 assigns a value of 0.38 seconds as the first delay for the video sink device 21, which still results in a lip-sync delay at the Bluetooth devices of +30 ms on one Bluetooth device 23 and −120 ms on another Bluetooth device 23 (i.e., after receiving the audio data from the set-top box 20). Although there is a respective lip-sync delay on each Bluetooth device 23, the lip-sync delays are still with the acceptable lip-sync tolerance range for the Bluetooth devices of between +40 ms for an acceptable leading audio signal and −120 ms for an acceptable lagging audio signal.

Thus, the users of the Bluetooth devices can watch the A/V content such as television programming and movies on the video sink device 21 while listening to the audio data on the Bluetooth devices 23 without experiences noticeable lip-sync problems. The acceptable lip-sync tolerance range and the first delay can be predetermined or selected by the user, and stored in the RAM 31 or non-volatile memory 32 for use by the controller 30. The acceptable lip-sync tolerance range and the first delay can also be adjusted to accommodate different types of Bluetooth devices and Bluetooth protocols being implemented.

As noted above, the present invention can be implemented not only as an apparatus or system, but also as a method and algorithm for achieving synchronization between the A/V data presented by a video sink device and audio data executed on one or Bluetooth devices. The present invention can be implemented as a program on a non-transitory computer-readable medium for causing a computer, such as the controller in set-top box, to execute the step described in FIGS. 6, 8 and 10. The non-transitory computer-readable recording medium could be, for example, a CD-ROM, DVD, Blu-ray disc, or an electronic memory device.

The present invention may be implemented as any combination of a system, a method, an integrated circuit, and a computer program on a non-transitory computer readable recording medium. The controller and any other parts of the electronic apparatuses may be implemented as Integrated Circuits (IC), Application-Specific Integrated Circuits (ASIC), or Large Scale Integrated circuits (LSI), system LSI, super LSI, or ultra LSI components which perform a part or all of the functions of the electronic apparatuses, such as set-top boxes.

Each of the parts of the present invention can be implemented using many single-function components, or can be one component integrated using the technologies described above. The circuits may also be implemented as a specifically programmed general purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing the controller to perform the methods/algorithms. Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms is exemplary, and algorithms having a sequence other than the above described sequences are contemplated. Moreover, steps, or parts of the algorithm, may be implemented simultaneously or in parallel.

The components of the present invention can be in the form of a set-top box as in the exemplary embodiments disclosed above, or in other standalone devices, or may be incorporated in a television or other content playing apparatus, or other device or appliance, and the scope of the present invention is not intended to be limited on such forms.

It is also contemplated that the implementation of the components of the present invention can be done with any newly arising technology that may replace any of the above implementation technologies. For example, the present application describes the embodiments of the present invention with reference to synchronization issues between A/V data displayed on a video sink device and audio data listened to on Bluetooth devices. However, it is contemplated by the invention that the electronic apparatus, method, and algorithm could be implemented to address synchronization issues between A/V data displayed on a video sink device and audio data listened to on other similar types of short range wireless devices. For example, the electronic apparatus could be modified to replace the Bluetooth transceiver with a wireless transceiver that utilizes a wireless protocol that is compatible with the wireless protocol used by any short range wireless device. For example, it is contemplated that the electronic apparatus, method and algorithm can be applied using other radio communication protocols rather than Bluetooth, such as Zigbee, IEEE802.15.4, IEEE802.11, RF4CE, or other later developed protocols.

We claim:

1. An electronic apparatus for achieving synchronization between video data displayed on a video sink device and audio data executed on one or more short range wireless devices, the electronic apparatus comprising:
   an input circuit that receives audio/video (A/V) content from an A/V content provider;
   an A/V decoder that decodes the A/V content to obtain video data and audio data;
   an output circuit that outputs the video and audio data to the video sink device;
   a wireless transceiver that wirelessly communicates information with the one or more short range wireless devices according to a wireless protocol, the information including the audio data; and
   a controller configured to:
      obtain calibration information for the one or more short range wireless devices, the calibration information being associated with delays relating to the wireless transceiver transmitting the audio data to the one or more short range wireless devices using the wireless protocol and the one or more short range wireless devices processing the audio data,
      determine a first delay for outputting the video and audio data to the video sink device using the calibration information, the first delay representing a time difference between the video sink device displaying video data and the one or more short range wireless devices outputting audio data corresponding to the video data,
      control the wireless transceiver to output the audio data to the one or more short range wireless devices, and
      control the output circuit to apply the first delay so as to output the video and audio data to the video sink device after the first delay, such that the video data displayed by the video sink device is synchronized with the audio data output by the one or more short range wireless devices.

2. The electronic apparatus according to claim 1, further comprising:
   an Infrared (IR) receiver for receiving an IR signal from a remote electronic device, the IR signal being used for performing control operations on the electronic apparatus and the video sink device; and
   a user interface for receiving input instructions, the input instructions being used for performing control operations on the electronic apparatus and the video sink device.

3. The electronic apparatus according to claim 2, wherein the controller controls the output circuit to output a calibration animation to be displayed on the video sink device and controls the wireless transceiver to output a calibration audio signal to be executed on the one or more short range wireless devices,
   wherein the IR signal from a remote electronic device or the input instructions from the user interface include a command signal for synchronizing the calibration animation displayed on the video sink device with the calibration audio signal executed on the one or more short range wireless devices, and
   the controller uses the command signal as the calibration information for determining the first delay for outputting the video and audio data to the video sink device.

4. The electronic apparatus according to claim 3, wherein the output of the calibration animation displayed on the video sink device, output of the calibration audio signal to the one or more short range wireless devices, and use of the command signal for synchronizing the calibration animation with the calibration audio signal are performed in a calibration mode.

5. The electronic apparatus according to claim 1, wherein the controller further controls the wireless transceiver to:
output a time marker message and an audio clip to the one or more short range wireless devices, and
receive responses from the one or more short range wireless devices based on receipt of the time marker message and an audio clip, the responses including a first response with information to determine a round trip wireless transmission time between the electronic apparatus and the one or more short range wireless devices, and a second response with information on an audio processing time by the one or more short range wireless devices of the audio clip,
wherein the controller uses the first and second responses from the one or more short range wireless devices as the calibration information for determining the first delay for outputting the video and audio data to the video sink device.

6. The electronic apparatus according to claim 5, wherein the controller uses the calibration information for determining the first delay for outputting the video and audio data to the video sink device using a formula: First Delay=½(Round Trip Wireless Transmission Time)+(Audio Processing Time).

7. The electronic apparatus according to claim 1, wherein the controller further controls the wireless transceiver to:
output a time marker message and an audio clip to the one or more short range wireless devices, and
receive responses from the one or more short range wireless devices based on receipt of the time marker message and an audio clip, the responses including a first response with information to determine a round trip wireless transmission time between the electronic apparatus and the one or more short range wireless devices, and a second response with information on an audio processing time by the one or more short range wireless devices of the audio clip,
the controller uses the first and second responses from the one or more short range wireless devices to:
calculate a lag delay for each of the one or more short range wireless devices,
compare the lag delays of all the one or more short range wireless devices, and
determine a second delay for outputting the audio data to each of the one or more short range wireless devices based on the lag delays, respectively, and
the controller further controls the wireless transceiver to apply the second delays so as to output the audio data to each of the one or more short range wireless devices in accordance with the second delays, respectively, such that the video data displayed on the video sink device is synchronized with the audio data output by each of the one or more short range wireless devices.

8. The electronic apparatus according to claim 7, wherein the controller determines each of the lag delays for the one or more short range wireless devices using a formula: Lag Delay=½(Round Trip Wireless Transmission Time)+(Audio Processing Time).

9. The electronic apparatus according to claim 8, wherein each of the one or more short range wireless devices is assigned a value for the second delay that is inversely proportional to the calculated lag delay for each one of the one or more short range wireless devices, such that a short range wireless device having a longest lag delay has a shortest second delay.

10. The electronic apparatus according to claim 9, wherein the first delay for outputting the video and audio data to the video sink device is assigned a value that is equal to the longest lag delay calculated for the short range wireless device.

11. The electronic apparatus according to claim 10, wherein at least two of the short range wireless devices are assigned different values for the second delay.

12. The electronic apparatus according to claim 11, wherein the short range wireless device having the longest lag delay is assigned a value of zero for the second delay.

13. The electronic apparatus according to claim 1, wherein the wireless protocol is a Bluetooth, IEEE 802.11 (Wi-Fi), IEEE 802.15.4, Radio Frequency for Consumer Electronics (RF4CE), or ZigBee wireless protocol.

14. The electronic apparatus according to claim 1, wherein the electronic apparatus is a set-top box.

15. A method implemented on an electronic apparatus for achieving synchronization between video data displayed on a video sink device and audio data executed on one or more short range wireless devices, the method comprising:
receiving, using an input circuit, audio/video (A/V) content from an A/V content provider;
decoding, using an A/V decoder, the A/V content to obtain video data and audio data;
outputting, using an output circuit, the video and audio data to the video sink device;
wirelessly communicating, using a wireless transceiver, information with the one or more short range wireless devices according to a wireless protocol, the information including the audio data; and
using a controller to perform operations including:
obtaining calibration information for the one or more short range wireless devices, the calibration information being associated with delays relating to the wireless transceiver transmitting the audio data to the one or more short range wireless devices using the wireless protocol and the one or more short range wireless devices processing the audio data,
determining a first delay for outputting the video and audio data to the video sink device using the calibration information, the first delay representing a time difference between the video sink device displaying video data and the one or more short range wireless devices outputting audio data corresponding to the video data,
controlling the wireless transceiver to output the audio data to the one or more short range wireless devices, and
controlling the output circuit to apply the first delay so as to output the video and audio data to the video sink device after the first delay, such that the video data displayed by the video sink device is synchronized with the audio data output by the one or more short range wireless devices.

16. The method according to claim 15, further comprising:
receiving, using an Infrared (IR) receiver, an IR signal from a remote electronic device for performing control operations on the electronic apparatus and the video sink device; and
receiving, using a user interface, input instructions for performing control operations on the electronic apparatus and the video sink device.

17. The method according to claim 16, further comprising:
controlling, using the controller, the output circuit to output a calibration animation to be displayed on the video sink device and controlling the wireless transceiver to output a calibration audio signal to be executed on the one or more short range wireless devices, wherein the IR signal from the remote electronic device or the input instructions from the user interface includes a command signal for synchronizing the calibration animation displayed on the video sink device with the calibration audio signal executed on the one or more short range wireless devices, and the controller uses the command signal as the calibration information for determining the first delay for outputting the video and audio data to the video sink device.

18. The method according to claim 17, wherein the controlling of the output of the calibration animation displayed on the video sink device, outputting of the calibration audio signal to the one or more short range wireless devices, and using the command signal for synchronizing the calibration animation with the calibration audio signal are performed in a calibration mode.

19. The method according to claim 15, further comprising:

controlling, using the controller, the wireless transceiver to:

output a time marker message and an audio clip to the one or more short range wireless devices, and receive responses from the one or more short range wireless devices based on receipt of the time marker message and an audio clip, the responses including a first response with information on a round trip wireless transmission time between the electronic apparatus and the one or more short range wireless devices of the time marker message and the audio clip, and a second response with information on an audio processing time by the one or more short range wireless devices of the audio clip, wherein the controller uses the first and second responses from the one or more wireless devices as the calibration information for determining the first delay for outputting the video and audio data to the video sink device.

20. The method according to claim 19, wherein controller uses the calibration information for determining the first delay for outputting the video and audio data to the video sink device using the formula: First Delay=½(Round Trip Wireless Transmission Time)+(Audio Processing Time).

21. The method according to claim 15, further comprising:

controlling, using the controller, the wireless transceiver to:

output a time marker message and an audio clip to the one or more short range wireless devices, and receive responses from the one or more short range wireless devices based on receipt of the time marker message and an audio clip, the responses including a first response with information on a round trip wireless transmission time between the electronic apparatus and the one or more short range wireless devices of the time marker message and the audio clip, and a second response with information on an audio processing time by the one or more short range wireless devices of the audio clip, wherein the controller uses the first and second responses from the one or more short range wireless devices to:

calculate a lag delay for each of the one or more short range wireless devices, compare the lag delays of all the one or more short range wireless devices, and determine a second delay for outputting the audio data to each of the one or more short range wireless devices based on the lag delays, respectively, and wherein the controller further controls the wireless transceiver to apply the second delays so as to output the audio data to each of the one or more short range wireless devices in accordance with the second delays, respectively, such that the video data displayed on the video sink device is synchronized with the audio data output by each of the one or more short range wireless devices.

22. The method according to claim 21, wherein the controller determines each of the lag delays for the one or more short range wireless devices using a formula: Lag Delay=½(Round Trip Wireless Transmission Time)+(Audio Processing Time).

23. The method according to claim 22, further comprising:

assigning a value for the second delay to each of the one or more short range wireless devices that is inversely proportional to the calculated lag delay for each one of the one or more short range wireless devices, such that a short range wireless device having a longest lag delay has a shortest second delay.

24. The method according to claim 23, wherein the first delay for outputting the video and audio data to the video sink device is assigned a value that is equal to the longest lag delay calculated for the short range wireless device.

25. The method according to claim 24, wherein at least two of the short range wireless devices are assigned different values for the second delay.

26. The method according to claim 25, wherein the short range wireless device having the longest lag delay is assigned a value of zero for the second delay.

27. A non-transitory computer readable storage medium having stored thereon a program implemented on an electronic apparatus for achieving synchronization between video data displayed on a video sink device and audio data executed on one or more short range wireless devices, the program when executed by a processor causing the electronic apparatus to perform steps comprising:

receiving, using an input circuit, audio/video (A/V) content from an A/V content provider;

decoding, using an A/V decoder, the A/V content to obtain video data and audio data;

outputting, using an output circuit, the video and audio data to the video sink device;

wirelessly communicating, using a wireless transceiver, information with the one or more short range wireless devices according to a wireless protocol, the information including the audio data; and using a controller to perform operations including:

obtaining calibration information for the one or more short range wireless devices, the calibration information being associated with delays relating to the wireless transceiver transmitting the audio data to the one or more short range wireless devices using the wireless protocol and the one or more short range wireless devices processing the audio data, determining a first delay for outputting the video and audio data to the video sink device using the calibration information, the first delay representing a time difference between the video sink device displaying video data and the one or more short range wireless devices outputting audio data corresponding to the video data, controlling the wireless transceiver to output the audio data to the one or more short range wireless devices, and controlling the output circuit to apply the first delay so as to output the video and audio data to the video sink device after the first delay, such that the video data displayed by the video sink device is synchronized with the audio data output by the one or more short range wireless devices.

28. The non-transitory computer readable storage medium according to claim 27, wherein the program causes the electronic apparatus to perform steps further comprising:

receiving an Infrared (IR) signal from a remote electronic device for performing control operations on the electronic apparatus and the video sink device; and receiving input instructions from a user interface for performing control operations on the electronic apparatus and the video sink device.

29. The non-transitory computer readable storage medium according to claim 28, wherein the program causes the electronic apparatus to perform steps further comprising:

outputting a calibration animation to be displayed on the video sink device and outputting a calibration audio signal to be executed on the one or more short range wireless devices, wherein IR signal from a remote electronic device or the input instructions from the user interface includes a command signal for synchronizing the calibration animation displayed on the video sink device with the calibration audio signal executed on the one or more short range wireless devices, and the command signal is used as the calibration information for determining the first delay for outputting the video and audio data to the video sink device.

30. The non-transitory computer readable storage medium according to claim 29, wherein outputting of the calibration animation displayed on the video sink device, outputting of the calibration audio signal to the one or more short range wireless devices, and using the command signal for synchronizing the calibration animation with the calibration audio signal are performed in a calibration mode.

31. The non-transitory computer readable storage medium according to claim 27, wherein the program causes the electronic apparatus to perform steps further comprising:

outputting a time marker message and an audio clip to the one or more short range wireless devices, and receiving responses from the one or more short range wireless devices based on receipt of the time marker message and an audio clip, the responses including a first response with information on a round trip wireless transmission time between the electronic apparatus and the one or more short range wireless devices of the time marker message and the audio clip, and a second response with information on an audio processing time by the one or more short range wireless devices of the audio clip, wherein the first and second responses from the one or more short range wireless devices are used as the calibration information for determining the first delay for outputting the video and audio data to the video sink device.

32. The non-transitory computer readable storage medium according to claim 31, wherein the first delay for outputting the video and audio data to the video sink device is calculated using the formula: First Delay=½(Round Trip Wireless Transmission Time)+(Audio Processing Time).

33. The non-transitory computer readable storage medium according to claim 27, wherein the program causes the electronic apparatus to perform steps further comprising:

outputting a time marker message and an audio clip to the one or more short range wireless devices, and receiving responses from the one or more short range wireless devices based on receipt of the time marker message and an audio clip, the responses including a first response with information on a round trip wireless transmission time between the electronic apparatus and the one or more short range wireless devices of the time marker message and the audio clip, and a second response with information on an audio processing time by the one or more short range wireless devices of the audio clip, using the first and second responses from the one or more short range wireless devices to: calculate a lag delay for each of the one or more short range wireless devices, compare the lag delays of all the one or more short range wireless devices, and determine a second delay for outputting the audio data to each of the one or more short range wireless devices based on the lag delays, respectively, and controlling the wireless transceiver to apply the second delays so as to output the audio data to each of the one or more short range wireless devices in accordance with the second delays, respectively, such that the video data displayed on the video sink device is synchronized with the audio data output by each of the one or more short range wireless devices.

34. The non-transitory computer readable storage medium according to claim 33, wherein each of the lag delays for the one or more short range wireless devices are calculated using a formula: Lag Delay=½(Round Trip Wireless Transmission Time)+(Audio Processing Time).

35. The non-transitory computer readable storage medium according to claim 34, wherein the program causes the electronic apparatus to perform steps further comprising: assigning a value for the second delay to each of the one or more short range wireless devices that is inversely proportional to the calculated lag delay for each one of the one or more short range wireless devices, such that a short range wireless device having a longest lag delay has a shortest second delay.

36. The non-transitory computer readable storage medium accordingly to claim 35, wherein the first delay for outputting the video and audio data to the video sink device is assigned a value that is equal to the longest lag delay calculated for the short range wireless device.

37. The non-transitory computer readable storage medium according to claim 36, wherein at least two of the short range wireless devices are assigned different values for the second delay.

38. The non-transitory computer readable storage medium according to claim 37, wherein the short range wireless device having the longest lag delay is assigned a value of zero for the second delay.

* * * * *